United States Patent
Joshi

(10) Patent No.: US 7,496,651 B1
(45) Date of Patent: Feb. 24, 2009

(54) CONFIGURABLE GEOGRAPHIC PREFIXES FOR GLOBAL SERVER LOAD BALANCING

(75) Inventor: Prajakta S. Joshi, Cupertino, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 744 days.

(21) Appl. No.: 10/840,496

(22) Filed: May 6, 2004

(51) Int. Cl.
  *G06F 15/173* (2006.01)
(52) U.S. Cl. .................. 709/223; 709/217; 709/224; 718/105
(58) Field of Classification Search .......... 709/203, 709/217, 219, 223, 225, 226, 237, 239, 245, 709/224; 370/352, 401; 718/105
See application file for complete search history.

(56) References Cited

U.S. PATENT DOCUMENTS

| | | | |
|---|---|---|---|
| 5,031,094 A | 7/1991 | Toegel et al. ................ 364/200 |
| 5,359,593 A | 10/1994 | Derby et al. ................. 370/17 |
| 5,948,061 A | 9/1999 | Merriman et al. ........... 709/219 |
| 5,951,634 A | 9/1999 | Sitbon et al. ................ 709/105 |
| 6,006,269 A | 12/1999 | Phaal | |
| 6,006,333 A | 12/1999 | Nielsen | |
| 6,092,178 A | 7/2000 | Jindal et al. .................. 712/27 |
| 6,112,239 A | 8/2000 | Kenner et al. ............... 709/224 |
| 6,115,752 A | 9/2000 | Chauhan ..................... 709/241 |
| 6,128,279 A | 10/2000 | O'Neil et al. ................ 370/229 |
| 6,128,642 A | 10/2000 | Doraswamy et al. ........ 709/201 |
| 6,167,445 A | 12/2000 | Gai et al. | |
| 6,167,446 A | 12/2000 | Lister et al. ................. 709/223 |
| 6,182,139 B1 | 1/2001 | Brendel | |
| 6,195,691 B1 | 2/2001 | Brown | |
| 6,233,604 B1 | 5/2001 | Van Horne et al. .......... 709/203 |
| 6,286,039 B1 | 9/2001 | Van Horne et al. .......... 709/221 |
| 6,286,047 B1 | 9/2001 | Ramanathan et al. ....... 709/224 |
| 6,324,580 B1 | 11/2001 | Jindal et al. ................. 709/228 |
| 6,327,622 B1 | 12/2001 | Jindal et al. | |
| 6,336,137 B1 | 1/2002 | Lee et al. | |
| 6,381,627 B1 | 4/2002 | Kwan et al. ................. 709/201 |
| 6,389,462 B1 | 5/2002 | Cohen et al. ................ 709/218 |
| 6,427,170 B1 | 7/2002 | Sitaraman et al. ........... 709/226 |

(Continued)

OTHER PUBLICATIONS

Cisco Document, "Configuring the CSS Domain Name Service,", posted on Dec. 2000, Cisco Systems Inc., http://www.ciscosystems.com, pp. 1-13.

(Continued)

*Primary Examiner*—Lashonda T Jacobs
(74) *Attorney, Agent, or Firm*—Seed IP Law Group PLLC

(57) ABSTRACT

In a load balancing system, user-configurable geographic prefixes are provided. IP address prefix allocations provided by the Internet Assigned Numbers Authority (IANA) and associated geographic locations are stored in a first, static database in a load balancing switch, along with other possible default geographic location settings. A second, non-static database stores user-configured geographic settings. In particular, the second database stores Internet Protocol (IP) address prefixes and user-specified geographic regions for those prefixes. The specified geographic region can be continent, country, state, city, or other user-defined region. The geographic settings in the second database can override the information in the first database. These geographic entries help determine the geographic location of a client and host IP addresses, and aid in directing the client to a host server that is geographically the closest to that client.

23 Claims, 7 Drawing Sheets

U.S. PATENT DOCUMENTS

| | | | |
|---|---|---|---|
| 6,434,118 B1 | 8/2002 | Kirschenbaum | |
| 6,438,652 B1 | 8/2002 | Jordan et al. | 711/120 |
| 6,446,121 B1 | 9/2002 | Shah et al. | |
| 6,449,657 B2 | 9/2002 | Stanbach, Jr. et al. | 709/245 |
| 6,470,389 B1 | 10/2002 | Chung et al. | 709/227 |
| 6,480,508 B1 | 11/2002 | Mwikalo et al. | 370/475 |
| 6,490,624 B1 | 12/2002 | Sampson et al. | |
| 6,549,944 B1 | 4/2003 | Weinberg et al. | 709/224 |
| 6,578,066 B1 * | 6/2003 | Logan et al. | 718/105 |
| 6,606,643 B1 | 8/2003 | Emens et al. | 709/203 |
| 6,681,232 B1 | 1/2004 | Sistanizadeh et al. | 707/104.1 |
| 6,681,323 B1 | 1/2004 | Fontanesi et al. | 713/1 |
| 6,691,165 B1 | 2/2004 | Bruck et al. | |
| 6,745,241 B1 | 6/2004 | French et al. | |
| 6,772,211 B2 | 8/2004 | Lu et al. | |
| 6,789,125 B1 | 9/2004 | Aviani et al. | 709/238 |
| 6,826,198 B2 | 11/2004 | Turina et al. | |
| 6,839,700 B2 | 1/2005 | Doyle et al. | |
| 6,850,984 B1 | 2/2005 | Kalkunte et al. | |
| 6,874,152 B2 | 3/2005 | Vermeire et al. | |
| 6,879,995 B1 | 4/2005 | Chinta et al. | |
| 6,898,633 B1 | 5/2005 | Lyndersay et al. | 709/226 |
| 6,901,081 B1 | 5/2005 | Ludwig | |
| 6,928,485 B1 * | 8/2005 | Krishnamurthy et al. | 709/242 |
| 6,963,914 B1 | 11/2005 | Breitbart et al. | 709/226 |
| 6,963,917 B1 | 11/2005 | Callis et al. | 709/227 |
| 6,985,956 B2 | 1/2006 | Luke et al. | |
| 6,987,763 B2 | 1/2006 | Rochberger et al. | 370/389 |
| 6,996,615 B1 | 2/2006 | McGuire | |
| 6,996,616 B1 | 2/2006 | Leighton et al. | |
| 7,000,007 B1 | 2/2006 | Valenti | 709/219 |
| 7,020,698 B2 | 3/2006 | Andrews et al. | 709/223 |
| 7,020,714 B2 | 3/2006 | Kalyanaraman et al. | |
| 7,028,083 B2 * | 4/2006 | Levine et al. | 709/223 |
| 7,032,010 B1 | 4/2006 | Swildens et al. | 709/219 |
| 7,036,039 B2 | 4/2006 | Holland | |
| 7,058,717 B2 | 6/2006 | Chao et al. | |
| 7,062,642 B1 | 6/2006 | Langrind et al. | |
| 7,082,102 B1 | 7/2006 | Wright | |
| 7,086,061 B1 | 8/2006 | Joshi et al. | 718/105 |
| 7,089,293 B2 | 8/2006 | Grosner et al. | |
| 7,136,932 B1 | 11/2006 | Schneider | |
| 7,139,242 B2 | 11/2006 | Bays | |
| 7,177,933 B2 * | 2/2007 | Foth | 709/226 |
| 7,185,052 B2 | 2/2007 | Day | |
| 7,197,547 B1 | 3/2007 | Miller et al. | |
| 7,206,806 B2 | 4/2007 | Pineau | |
| 7,225,272 B2 | 5/2007 | Kelley et al. | |
| 7,240,015 B1 | 7/2007 | Karmouch et al. | |
| 7,240,100 B1 | 7/2007 | Wein et al. | |
| 7,254,626 B1 | 8/2007 | Kommula et al. | |
| 7,257,642 B1 | 8/2007 | Bridger et al. | |
| 7,260,645 B2 | 8/2007 | Bays | |
| 7,296,088 B1 * | 11/2007 | Padmanabhan et al. | 709/238 |
| 7,321,926 B1 | 1/2008 | Zhang et al. | |
| 7,423,977 B1 | 9/2008 | Joshi | |
| 2001/0049741 A1 | 12/2001 | Skene et al. | |
| 2001/0052016 A1 * | 12/2001 | Skene et al. | 709/226 |
| 2002/0026551 A1 | 2/2002 | Kamimaki et al. | 710/260 |
| 2002/0038360 A1 | 3/2002 | Andrews et al. | |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | 709/225 |
| 2002/0078233 A1 | 6/2002 | Biliris et al. | 709/238 |
| 2002/0091840 A1 | 7/2002 | Pulier et al. | 709/228 |
| 2002/0112036 A1 | 8/2002 | Bohannon et al. | 709/220 |
| 2002/0120743 A1 | 8/2002 | Shabtay et al. | 709/226 |
| 2002/0124096 A1 | 9/2002 | Loguinov et al. | |
| 2002/0133601 A1 | 9/2002 | Kennamer et al. | |
| 2002/0150048 A1 | 10/2002 | Ha et al. | |
| 2002/0154600 A1 | 10/2002 | Ido et al. | |
| 2002/0188862 A1 | 12/2002 | Trethewey et al. | 713/201 |
| 2002/0194324 A1 | 12/2002 | Guha | |
| 2002/0194335 A1 | 12/2002 | Maynard | 709/225 |
| 2003/0018796 A1 | 1/2003 | Chou et al. | |
| 2003/0031185 A1 | 2/2003 | Kilkuchi et al. | |
| 2003/0035430 A1 | 2/2003 | Islam et al. | |
| 2003/0065711 A1 | 4/2003 | Acharya et al. | 709/203 |
| 2003/0065763 A1 | 4/2003 | Swildens et al. | 709/224 |
| 2003/0105797 A1 | 6/2003 | Dolev et al. | 709/105 |
| 2003/0115283 A1 | 6/2003 | Babir et al. | |
| 2003/0135509 A1 | 7/2003 | Davis et al. | 707/100 |
| 2003/0154239 A1 | 8/2003 | Davis et al. | |
| 2003/0210686 A1 | 11/2003 | Terrell et al. | 370/389 |
| 2003/0210694 A1 | 11/2003 | Jayaraman et al. | 370/392 |
| 2003/0229697 A1 | 12/2003 | Borella | |
| 2004/0019680 A1 | 1/2004 | Chao et al. | |
| 2004/0024872 A1 | 2/2004 | Kelley et al. | 709/225 |
| 2004/0064577 A1 | 4/2004 | Dahlin et al. | |
| 2004/0194102 A1 | 9/2004 | Neerdaels | |
| 2004/0249939 A1 * | 12/2004 | Amini et al. | 709/225 |
| 2004/0249971 A1 | 12/2004 | Klinker | |
| 2005/0021883 A1 | 1/2005 | Shishizuka et al. | 710/20 |
| 2005/0033858 A1 | 2/2005 | Swildens et al. | 709/232 |
| 2005/0086295 A1 | 4/2005 | Cunnigham et al. | 709/203 |
| 2005/0149531 A1 | 7/2005 | Srivastava | 707/10 |
| 2005/0169180 A1 | 8/2005 | Ludwig | |
| 2005/0286416 A1 | 12/2005 | Shimonishi et al. | |
| 2006/0036743 A1 | 2/2006 | Deng et al. | |

OTHER PUBLICATIONS

Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.
U.S. Appl. No. 09/670,487, filed Sep. 26, 2000, Hsu et al.
U.S. Appl. No. 10/206,508, filed Jul. 25, 2002, Kommula et al.
U.S. Appl. No. 10/214,921, filed Aug. 7, 2002, Kommula.
U.S. Appl. No. 10/305,823, filed Nov. 27, 2002, Joshi et al.
U.S. Appl. No. 10/376,903, filed Feb. 28, 2003, Kommula.
U.S. Appl. No. 10/377,364, filed Feb. 28, 2003, Kommula.
U.S. Appl. No. 10/674,627, filed Sep. 29, 2003, Joshi.
U.S. Appl. No. 10/839,919, filed May 6, 2004, Joshi.
U.S. Appl. No. 10/924,552, filed Aug. 23, 2004, Joshi.
U.S. Appl. No. 11/429,177, filed May 5, 2006, Joshi et al.
Genova, Z., et al., "Challenges to URL Switching for Implementing Globally Distributed Web Sites," Department of Computer Science and Engineering, University of South Florida, pp. 1-9, Aug. 11, 2000.
Joshi, "Smoothing Algorithm for Round Trip Time (RTT) Measurements," assigned U.S. Appl. No. 12/177,201, filed Jul. 21, 2008.
Albitz, P., et al., "DNS and BIND in a Nutshell," O'Reilly & Associates, Sebastopol, CA, 1992, pp. 214-215.
Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.
Alteon WebSystems, Inc., "Enhancing Web User Experience with Global Server Load Balancing," Jun. 1999, 8 pages.
Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.
Nortel Networks, "Alteon Personal Content Director," © 2001, can be retrieved from http://www.nortelnetworks.com/personalinternet, 4 pages.
IBM Corp., *IBM WebSphere Performance Pack: Load Balancing with IBM SecureWay Network Dispatcher*, First Edition, Chapter 1, 2, 4, and 8, Oct. 1999.
IBM Corp., *SecureWay® Network Dispatcher: User's Guide—Version 2.1 for AIX, Solaris and Windows NT*, Third Edition, Chapters 3, 4, 9, 10, 11, and Appendices C & E, Mar. 1999.

Yerxa, G., "ACElerate on Fast Track for Load-Balancing," Mar. 8, 1999, retrieved Nov. 5, 2002, from http://www.networkcomputing.com/1005/1005sp2.html, pp. 1-4.

Alteon WebSystems, "PCD White Paper," *AlteonWebSystems*, pp. 1-8, Mar. 2001.

Cardellini, V., et al., "Dynamic Load Balancing on Web-server Systems," *IEEE Internet Computing*, 3(3):28-39, May-Jun. 1999.

Foundry Networks, Inc., "Server Load Balancing in Today's Web-enabled Enterprises," *White Paper*, pp. 1-10, Apr. 2002.

Genova, Z., et al., "Challenges in URL Switching for Implementing Globally Distributed Web Sites," *IEEE*, pp. 89-94, 2000.

Bestavros, Azer, "WWW Traffic Reduction and Load Balancing through Server-Based Caching," *IEEE Concurrency*, pp. 56-67, Jan.-Mar. 1997.

Paul, Arindam et al., "Balancing Web Server Load for Adaptable Video Distribution," *IEEE* pp. 469-476, 2000.

U.S. Appl. No. 11/707,697, filed Feb. 16, 2007, entitled "Global Server Load Balancing", inventor: Suanda L. Kommula et al.

* cited by examiner

CONFIGURABLE GEOGRAPHIC PREFIXES FOR GLOBAL SERVER LOAD BALANCING

TECHNICAL FIELD

This disclosure relates generally to load balancing among servers. More particularly but not exclusively, the present disclosure relates to techniques to configure geographic information, such as geographic prefixes and geographic region designations for network addresses, for use in load balancing to determine a geographically optimum server to receive a client request.

BACKGROUND INFORMATION

Under the Transmission Control Protocol/Internet Protocol (TCP/IP), when a client provides a symbolic name (a Uniform Resource Locator or URL) to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The client first provides the host name portion to a local name resolver, which then queries a local Domain Name System (DNS) server to obtain a corresponding IP address. If a corresponding IP address is not locally cached at the time of the query, or if the time-to-live (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS server for responding to future queries regarding the same host name, until the TTL of the IP addresses expires.

To provide some load sharing among the host servers, global server load balancing (GSLB) switches are sometimes used as proxies for authoritative DNS servers, together with one or more site switches each associated with one or more host servers. Each site switch provides the GSLB switch with current site-specific information ("metrics") regarding access conditions to the host servers associated with the site switches. The GSLB switch then processes the addresses returned by the DNS server using the metrics compiled from the site switches and provides an ordered address list having the optimum address for access listed at the top. An example of a GSLB system and description of associated metrics are disclosed in U.S. application Ser. No. 10/376,903, entitled "GLOBAL SERVER LOAD BALANCING," filed Feb. 28, 2003, assigned to the same assignee as the present application, and which is incorporated herein by reference in its entirety.

A criterion that is sometimes used for load balancing purposes is geographic location. That is, where there are multiple geographically located servers, load balancing systems attempt to direct client requests to a server that is geographically the closest to the client. The geographic location of the client and the servers is determined using a static table containing Internet Assigned Numbers Authority (IANA)-allocated IP address prefixes and the associated geographic locations. However, such load balancing systems that are based on static mappings between the IP address prefixes and the geographic locations have drawbacks that lead to less-than optimum performance.

For instance, load balancing systems generally maintain only a static table of some IANA-allocated IP address prefixes and the associated geographic designation. This table may be in the form of a database having IP address prefixes (e.g., IP address/prefix length) and the corresponding geographic locations (e.g., the country and region designation) for the respective IP address prefixes. There are several shortcomings to just having such a static geographic database.

First, a load balancing system maintains only some, and generally not all, of the IANA-allocated entries in its statically generated database. This is because IP address allocation by the IANA is an ongoing process, and so the load balancing software will have to be updated each time a new IP address and/or address prefix is allocated, in order to keep up with the latest IANA allocations. Since constant updating of the load balancing software and static geographic database is not practical, the load balancing system would be missing many IP address prefixes and associated geographic location information in its geographic database, and hence would not be able to determine the geographic location of many clients correctly.

Additionally, users (such as system administrators) generally cannot override the geographic region for a prefix. For instance, a prefix 149.204.0.0/16 may be specified as being in the geographic region EUROPE in a load balancing switch's internal static geographic prefix database. If the user has a client with an address of 149.204.11.1, which actually resides in ASIA, there is currently no suitable technique in which the user can override the geographic region for the prefix specified in the database. This means that the load balancing switch will always treat the client at 149.204.11.1 as being in the geographic region EUROPE, even though the user wants the prefix to be associated with ASIA.

BRIEF SUMMARY OF THE INVENTION

One aspect provides a method that includes storing first geographic settings associated with network addresses, including storing first address prefix information and corresponding first geographic region information. The method stores second geographic settings associated with network addresses, including storing second address prefix information and corresponding second geographic region information. The method overrides the first geographic settings with respective second geographic settings for network addresses that have first prefix information that matches the second prefix information, to associate these network addresses to the second geographic region information. Using at least the second geographic settings as a metric, the method load balances traffic, from a client having a network address associated with the second geographic information, to a domain represented by the network addresses associated with the second geographic information.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
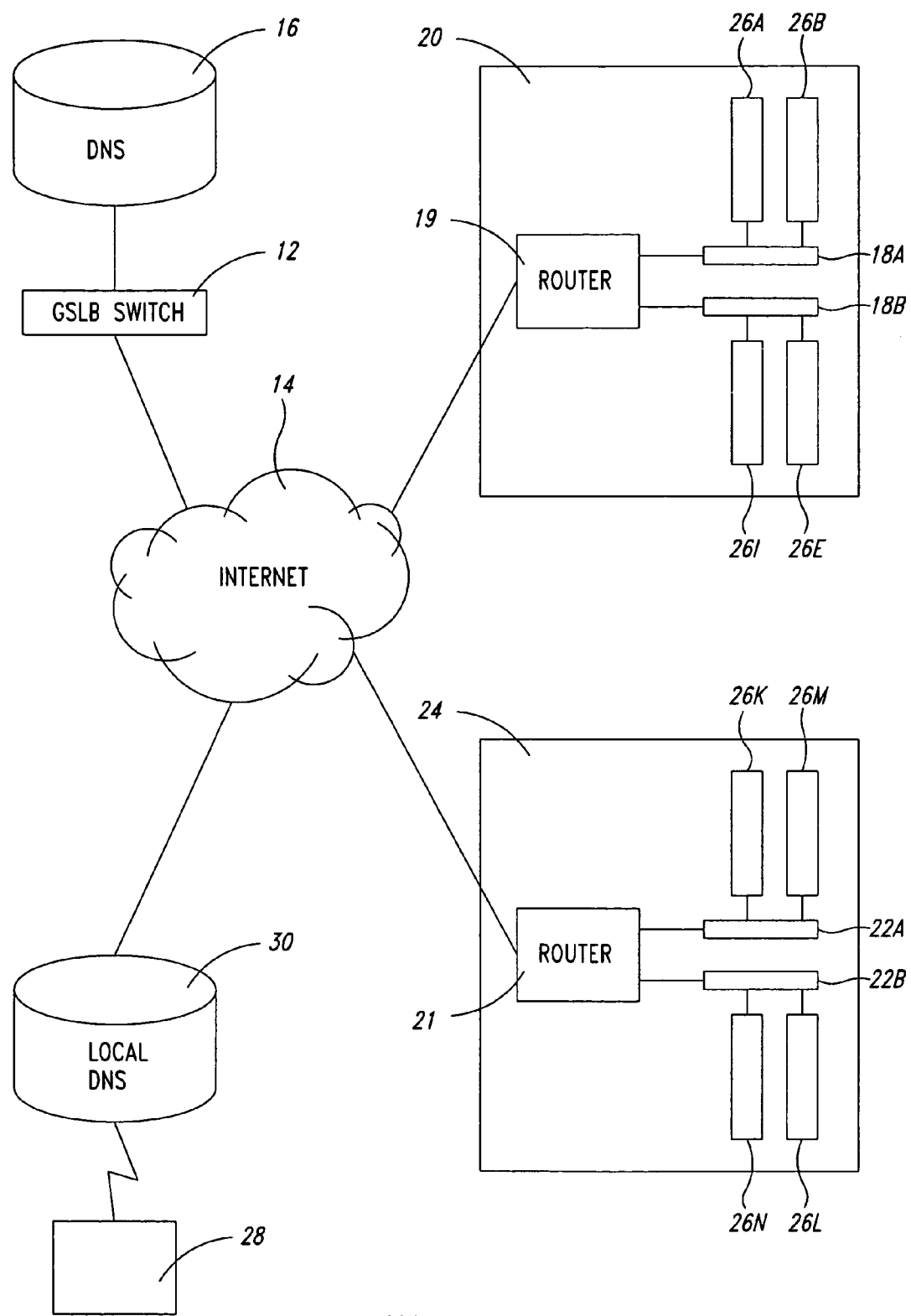
FIG. 1 illustrates a GSLB system in which an embodiment may be implemented.

Embodiments of techniques to provide configurable geographic prefixes for GSLB are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment provides "user-configurable geographic prefixes" features that overcome the above-described shortcomings and provides several other advantages. With the user-configurable geographic prefix feature(s), the prefix (or other address portion) and the associated geographic region for that prefix can be specified. For instance, "region" could be defined based on a continent, country, state, city, or other user-defined area. In an embodiment, the user-configurable geographic prefixes can be implemented for a GSLB system, where a load balancing switch or other network device maintains a separate user-configured geographic prefix database to store the various entries. If a prefix also exists in a static internal geographic database maintained by the load balancing switch, then the user-configured entry will override it (e.g., if the prefix 200.0.0.0/8 is SOUTH AMERICA in the internal geographic database and if the user configures a geographic prefix 200.0.0.0/8 to be in the region NORTH AMERICA, then the user-configured entry will override the earlier entry, and any IP address that matches the prefix 200.0.0.0/8 will deemed to reside in NORTH AMERICA).

As described above, the user-configurable geographic prefix feature(s) can be implemented in a GSLB system. In the GSLB system, a set of metrics are used by the load balancing switch to evaluate IP addresses in the DNS replies from the DNS server for which the load balancing switch is providing GSLB. The load balancing switch may initially generate the static internal database of geographic prefixes using the IANA-allocated IP address prefixes and the associated geographic location information. These, static database entries (including any default static geographic region specifications) may be overridden with user-configured entries, as needed, in accordance with an embodiment. The geographic location of a server (e.g., a server that is geographically close to a client) can then be used as one of the metrics in the GSLB policy to determine the best IP address to receive a request from the client.

FIG. 1 illustrates one example global server load balancing system with which an embodiment may be implemented. As shown in FIG. 1, a GSLB switch 12 (i.e., a load balancing switch) is connected to an Internet 14 and acts as a proxy to an authoritative Domain Name System (DNS) server 16 for a domain "foundrynet.com" (for example). That is, while the authoritative DNS server 16 provides the actual DNS service, the IP address known to the rest of the Internet 14 for the authoritative DNS server 16 of the domain "foundrynet.com" is a virtual IP (VIP) address configured on the GSLB switch 12. Of course, authoritative DNS server 16 can also act simultaneously as an authoritative DNS for other domains. The GSLB switch 12 communicates, via the Internet 14, with site switches 18A and 18B at site 20, site switches 22A and 22B at site 24, and any other similarly configured site switches. The site switches 18A, 18B, 22A and 22B are shown, for example, connected to routers 19 and 21 respectively and to servers 26A, . . . , 26I, . . . 26N. Some or all of the servers 26A, . . . , 26I, . . . , 26N may host application server programs (e.g., http and ftp and others). These host servers are reached through the site switches 18A, 18B, 22A and 22B using one or more virtual IP addresses configured at the site switches, which act as proxies to the host servers.

A suitable switch for implementing either the GSLB switch 12 or any of the site switches 18A, 18B, 22A and 22B is the ServerIron® (SI) product available from Foundry Networks, Inc. of San Jose, Calif. Throughout this description and in the figures, the SI switch will be described as the network device that can provide and implement the various geographic features of an embodiment. It is understood that this use of the SI switch is merely for purposes of illustration and explanation. Any suitable non-SI switch or non-SI network device can be used to implement the various geographic features and functions described herein.

FIG. 1 also shows a client program 28 connected to the Internet 14, and that communicates with a local DNS server 30. When a browser on the client program 28 requests a web page, for example, using a Universal Resource Locator (URL), such as http://www.foundrynet.com/index.htm, a query is sent to the local DNS server 30 to resolve the symbolic host name www.foundrynet.com to an IP address of a host server. The client program 28 receives from the DNS server 30 a list of IP addresses corresponding to the resolved host name. This list of IP addresses is either retrieved from the local DNS server 30's cache, if the TTL of the responsive IP addresses in the cache has not expired, or obtained from the GSLB switch 12, as a result of a recursive query. Unlike the prior art, however, this list of IP addresses is ordered by the GSLB switch 12 based on performance metrics as described in further detail in U.S. application Ser. No. 09/670,487, entitled "GLOBAL SERVER LOAD BALANCING," filed Sep. 26, 2000; in U.S. application Ser. No. 10/206,580, entitled "GLOBAL SERVER LOAD BALANCING," filed Jul. 25, 2002 (disclosing embodiments of a connection-load metric for GSLB); in U.S. application Ser. No. 10/305,823, entitled "DISTRIBUTED HEALTH CHECK FOR GLOBAL SERVER LOAD BALANCING," filed Nov. 27, 2002 (disclosing embodiments for distributing health check tasks to peer metric agents); and in U.S. application Ser. No. 10/376, 903, entitled "GLOBAL SERVER LOAD BALANCING,"

filed Feb. 28, 2003 (disclosing embodiments of weighted site, weighted IP, and active bindings metrics); all of which are assigned to the same assignee as the present application and incorporated herein by reference in their entireties. These are a few example applications where various GSLB performance metrics are described. For the sake of brevity, these various performance metrics and the manner in which they are used in a GSLB algorithm to identify best sites in a list of IP addresses are only summarized and not described in detail herein. Such additional details may be found in these co-pending applications and in the applications that they reference.

In the remainder of this detailed description, for the purpose of illustrating embodiments only and except where indicated, the list of IP addresses returned are assumed to be the virtual IP addresses configured on the proxy servers at switches 18A, 18B, 22A and 22B (sites 20 and 24). In one embodiment when the authoritative DNS server 16 resolves a host name in a query and returns one or more IP addresses, the GSLB switch 12 determines (using the performance metrics) which site switch would provide the best expected performance (e.g., response time) for the client program 28 and returns the IP address list with a virtual IP address configured at that site switch placed at the top. (Other forms of ranking or weighting the IP addresses in the list can also be possible.) The client program 28 can receive the ordered list of IP addresses, and typically selects the first IP address on the list to access the corresponding host server.

Figure 2:
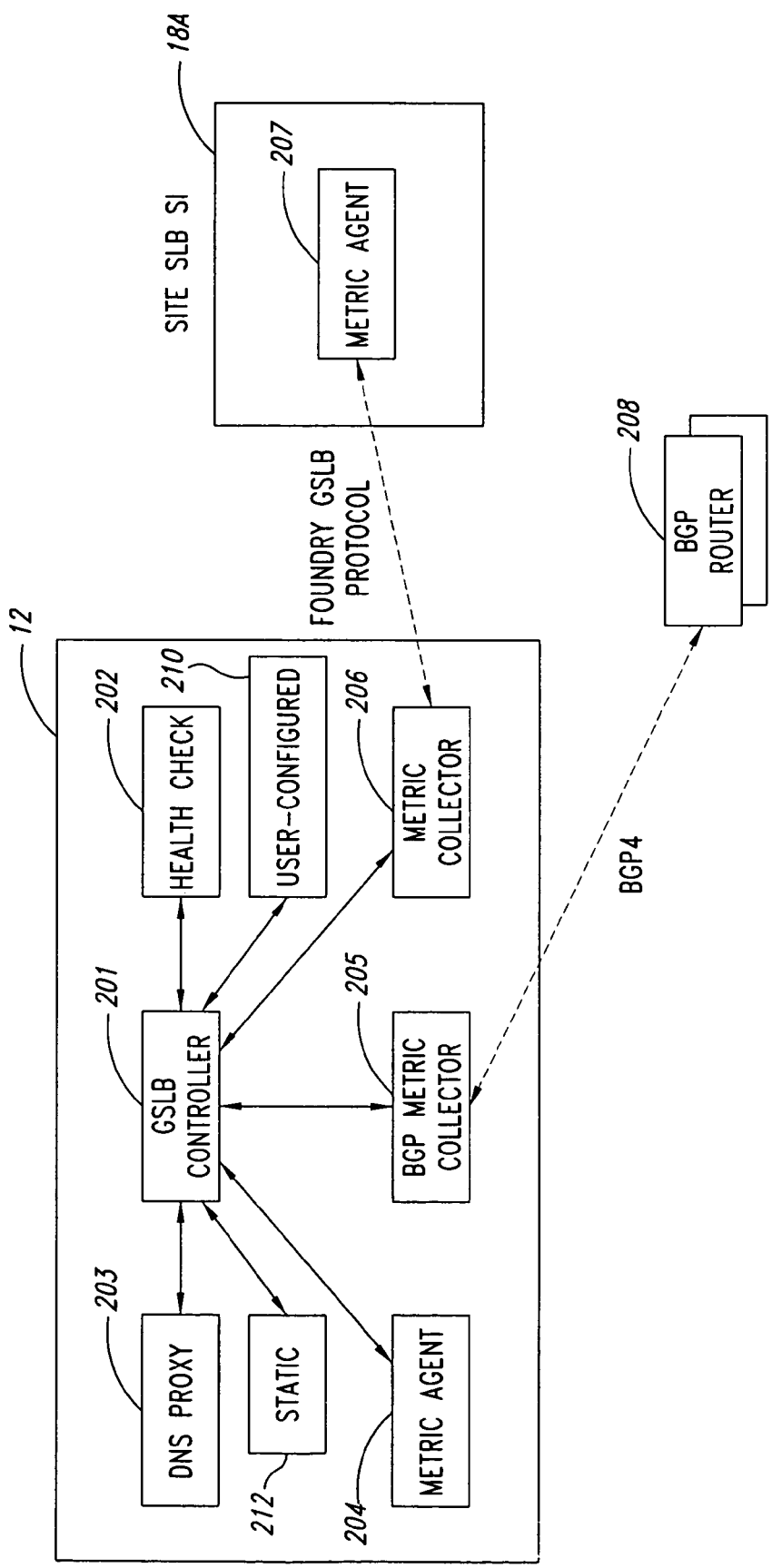
FIG. 2 illustrates a GSLB switch of FIG. 1 according to an embodiment.

FIG. 2 is a block diagram showing the functional modules of an embodiment of the GSLB switch 12 and site switch 18A (for instance) relevant to the global server load balancing function, including functions and features associated with geographic data. As shown in FIG. 2, the GSLB switch 12 includes a GSLB switch controller 201, health check module 202, DNS proxy module 203, metric agent 204, routing metric collector 205, and metric collector 206. The GSLB switch controller 201 provides general control functions for the operation of the GSLB switch 12. The health check module 202 is responsible for querying, either periodically or on demand, host servers and relevant applications hosted on the host servers to determine the "health" (e.g., whether or not it is available) of each host server and each relevant application. The metric collector 206 communicates with metric agents in site-specific switches (e.g., FIG. 2 shows the metric collector 206 communicating with a remote metric agent 207 of a site server load balancing ServerIron® or "SLB SI") to collect site-specific metrics (e.g., number of available sessions on a specific host server and/or connection-load data indicative of connections-per-second at that host server at the site 18A, or other metrics data).

The routing metric collector 205 collects routing information from routers (e.g., topological distances between nodes on the Internet). FIG. 2 shows, for example, a router 208 providing the routing metric collector 205 with routing metrics (e.g., topological distance between the load balancing switch and the router), using the Border Gateway Protocol (BGP). The DNS proxy module 203 (A) receives incoming DNS requests, (B) provides the host names to be resolved to the DNS server 16, (C) receives from the DNS server 16 a list of responsive IP addresses, (D) orders the IP addresses on the list received from the DNS server 16, using the metrics collected by the routing-metric collector 405 and the site specific collector 406, and values of any other relevant parameter (including geographic criteria), and (E) provides the ordered list of IP addresses to the requesting DNS server. Since the GSLB switch 12 can also act as a site switch, the GSLB switch 12 is provided with the metric agent 204 for collecting metrics for a metric collector.

In one embodiment, the GSLB switch controller 201 can be programmed with and/or can access data to be used for geographic metrics and also for at least one of weighted site, weighted IP, active bindings, or other metrics described in the co-pending applications identified above. For instance, the GSLB switch controller 201 can be communicatively coupled to a first storage unit 212 that contains IANA-allocated geographic prefixes and the associated geographic designation, or default geographic-related settings. The GSLB switch controller 201 can also be communicatively coupled to a second storage unit 210 that contains user-configured geographic settings. In an embodiment, the first storage unit 212 and the second storage unit 210 can be in the form of databases having tables. It is appreciated, however, that either or both of these storage units can be embodied by any suitable data structure (including file systems, directory structures, variables, static or dynamic code, and so forth). Additionally, the first and second storage units need not necessarily be separate, and may be integrated in whole or in part into a single storage unit, for instance.

Figure 3:
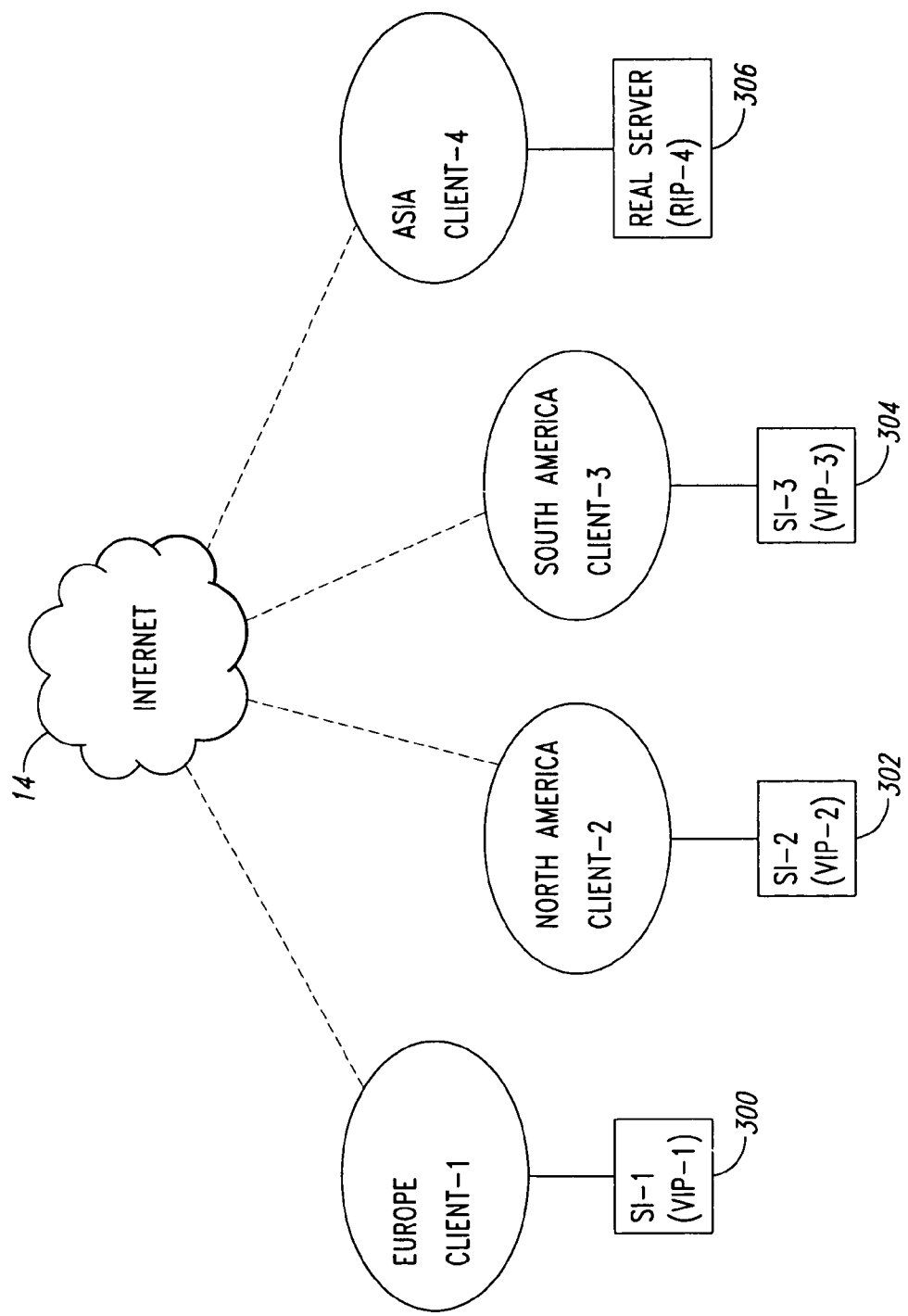
FIG. 3 illustrates an example application of geographic criteria for GSLB according to an embodiment.

FIG. 3 illustrates an example application of geographic criteria for GSLB according to an embodiment. As described above, one of the metrics that can be used by an embodiment of the GSLB switch 12 to select the best IP address for clients is the geographic metric. This metric enables the GSLB switch controller 201 to direct a client to a server that is geographically the closest to that client. In the example illustrated in FIG. 3: The GSLB switch 12 (not shown) provides GSLB for the domain www.foo.com. There are four IP addresses configured for www.foo.com: VIP-1, VIP-2, VIP-3, and RIP-4. VIP-1 is a virtual server IP address on a site switch 300 (SI-1) that resides in EUROPE. VIP-2 is a virtual server IP address on a site switch 302 (SI-2) that resides in NORTH AMERICA, VIP-3 is a virtual server IP address on a site switch 304 (SI-3) that resides in SOUTH AMERICA, and RIP-4 is a real server 306's IP address that resides in ASIA. As indicated in the example of FIG. 3, Client-1 resides in the continent of EUROPE; Client-2 is in NORTH AMERICA, Client-3 is in SOUTH AMERICA, and Client-4 is in ASIA.

When the geographic metric is used by the GSLB switch 12 to select the best IP address for the client then:

a> If Client-1 makes a request for www.foo.com, the GSLB switch 12 will select VIP-1 as the best IP address for Client-1 since VIP-1 is the closest geographically to Client-1 (e.g., both are in EUROPE);

b> If Client-2 makes a request for www.foo.com, the GSLB switch 12 will select VIP-2 as the best IP address for Client-2 since VIP-2 is the closest geographically to Client-2 (e.g., both are in NORTH AMERICA);

c> If Client-3 makes a request for www.foo.com, the GSLB switch 12 will select VIP-3 as the best IP address for Client-3 since VIP-3 is the closest geographically to Client-3 (e.g., both are in SOUTH AMERICA); and d> If Client-4 makes a request for www.foo.com, the GSLB switch 12 will select RIP-4 as the best IP address for Client-4 since RIP-4 is the closest geographically to Client-4 (e.g., both are in ASIA).

Thus, the GSLB switch 12 of an embodiment uses the geographic metric to select the IP address that is geographically the closest to the querying client. Geographical "closeness" can be specified in multiple non-exhaustive ways. The user can specify the following, for example:

a> A client and server are to be considered geographically close if they lie in the same continent.

b> A client and server are considered to be geographically close if they lie in the same country.

c> A client and server are considered to be geographically close if they reside in the same state, city, district, etc.

d> The user can also define a fictional area and define any entity residing in that area as geographically "close."

In an embodiment, the GSLB switch 12 deduces the geographic region of a client or server based on its IP address. The IANA assigns the IP addresses, and the GSLB switch 12 generates the static table (e.g., in the first storage unit 212) of the mappings between an IP address prefix and the corresponding geographic location. Either or both the IANA allocations or other geographic settings (including user-configured settings) may be used to deduce the geographic region of a client or server.

As an example, in the statically generated table in the first storage unit 212, the geographic region for the prefix 149.204.0.0/16 is EUROPE. Therefore, if Client-1 has an IP address 149.204.10.1, then the GSLB switch 12 refers to this static table and determines that Client-1 is in the region EUROPE. The GSLB switch 12 determines the geographic location of a real server 306 similarly based on the IP address. The GSLB switch 12 determines the geographic location of a VIP based on the management IP address of the site switch (e.g., the site switches 18A, 18B, 22A, 22B, 300-304, etc.) on which this VIP is configured. Thus, if the site switch 300 has an IP address of 149.204.53.1, then the GSLB switch 12 determines that the site switch 300 is in the region EUROPE. Therefore, VIP-1, which is configured on the site switch 300, will be deemed to be in the region EUROPE.

As additional examples and details, an embodiment of the GSLB switch 12 determines the geographic region of a server IP address in its DNS database (not shown) in the following ways:

For real IP addresses (as opposed to VIP addresses, which are logical IP addresses configured on the site switches), the geographic region is based on the IP address itself. If the user has configured a geographic prefix that matches the real server IP address, then the geographic location of the real server (e.g., the real server 306) will be obtained from the user-configured geographic prefix entry provided in the second storage unit 210.

For VIP addresses, the geographic region is based on the management IP address of the site switch on which the VIP is configured. If the user has configured a geographic prefix that matches the management IP address of the site switch on which the VIP is configured, then the geographic location of the VIP will be obtained from the user-configured geographic prefix entry provided in the second storage unit 210.

The user can further explicitly specify the region for a GSLB site if the management IP address of the site switch at that site is not indicative of the geographic location. For example, if the management IP address is in a private sub-net, the address does not indicate that site switch's geographic location. If the user specifies the region for the GLSB site at which the site switch resides in the second storage unit 210, the GSLB switch 12 uses the user-specified region instead of the region of the site switch's management IP address. If the user has configured a geographic prefix entry that matches the management IP address of the site switch and has also specified a geographic location for the GSLB site where that site switch resides, then the geographic location configured for the GSLB site will take precedence over that defined in the user-configured geographic prefix entry (i.e., the geographic region for a VIP configured on the remote site switch will be obtained from the geographic location configured for the GSLB site where the remote site switch resides instead of the geographic prefix entry that matches the management IP address of that remote site switch).

An embodiment of the GSLB switch 12 determines the geographic location of the client as follows:

For each client query, the GSLB switch 12 can determine the geographic location from which the client query came based on the client's IP address (or other address of a client terminal on which the client program 28 resides). If the IP address prefix of a user-configured geographic prefix entry in the second storage unit 210 matches that of the client, then the geographic location of the client will be determined from that user-configured geographic prefix entry.

If multiple server IP addresses compare equally based on at least some of the GSLB metrics in the GSLB policy, then the GSLB switch 12 uses the geographic metric to select the server IP addresses within the same geographic region as the client query. The flowcharts of FIGS. 4-6 illustrate implementation of these concepts in further detail.

Figure 4:
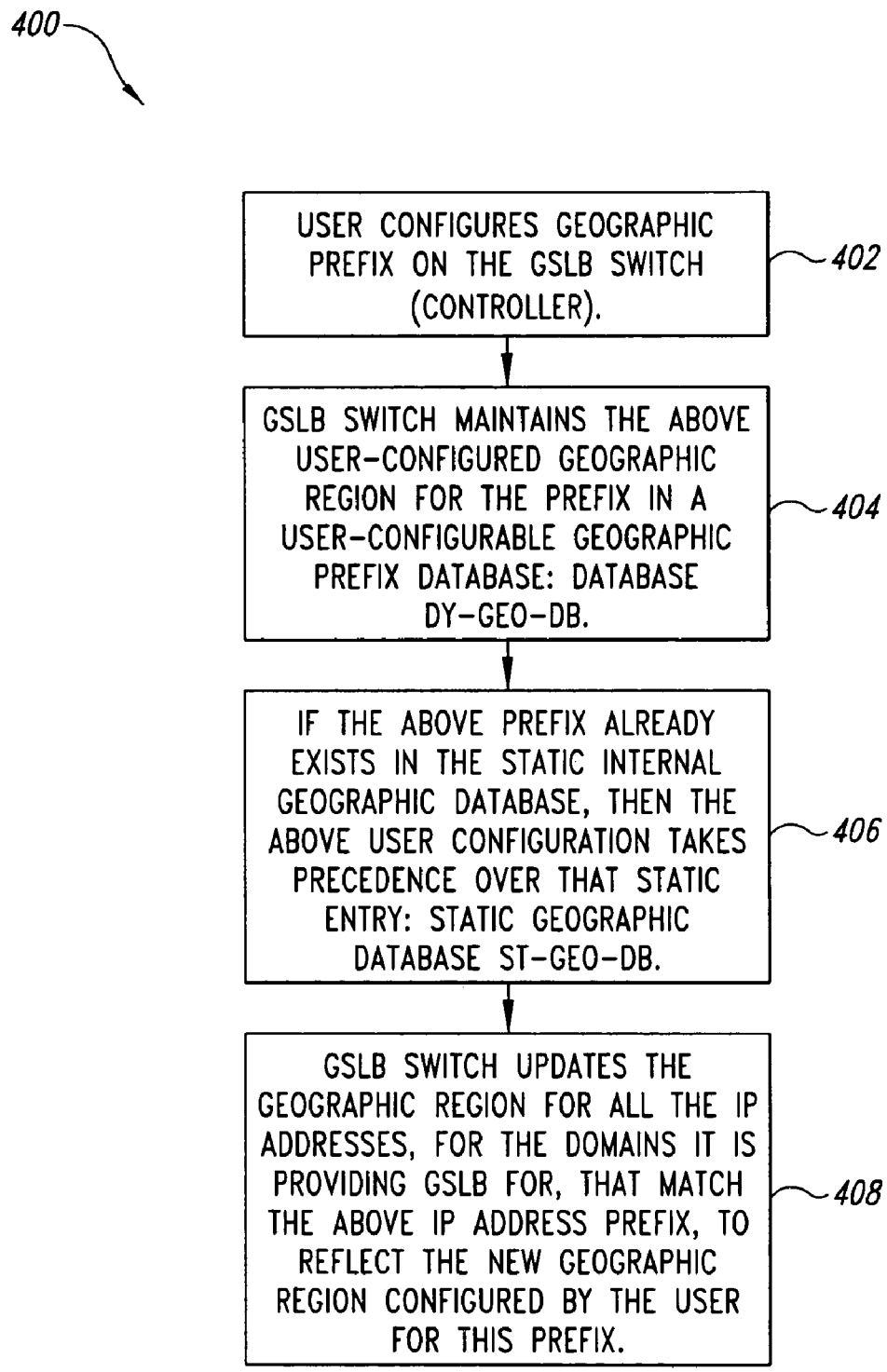
FIG. 4 is a flowchart that depicts configuration of geographic prefix data according to an embodiment.
Figure 5:
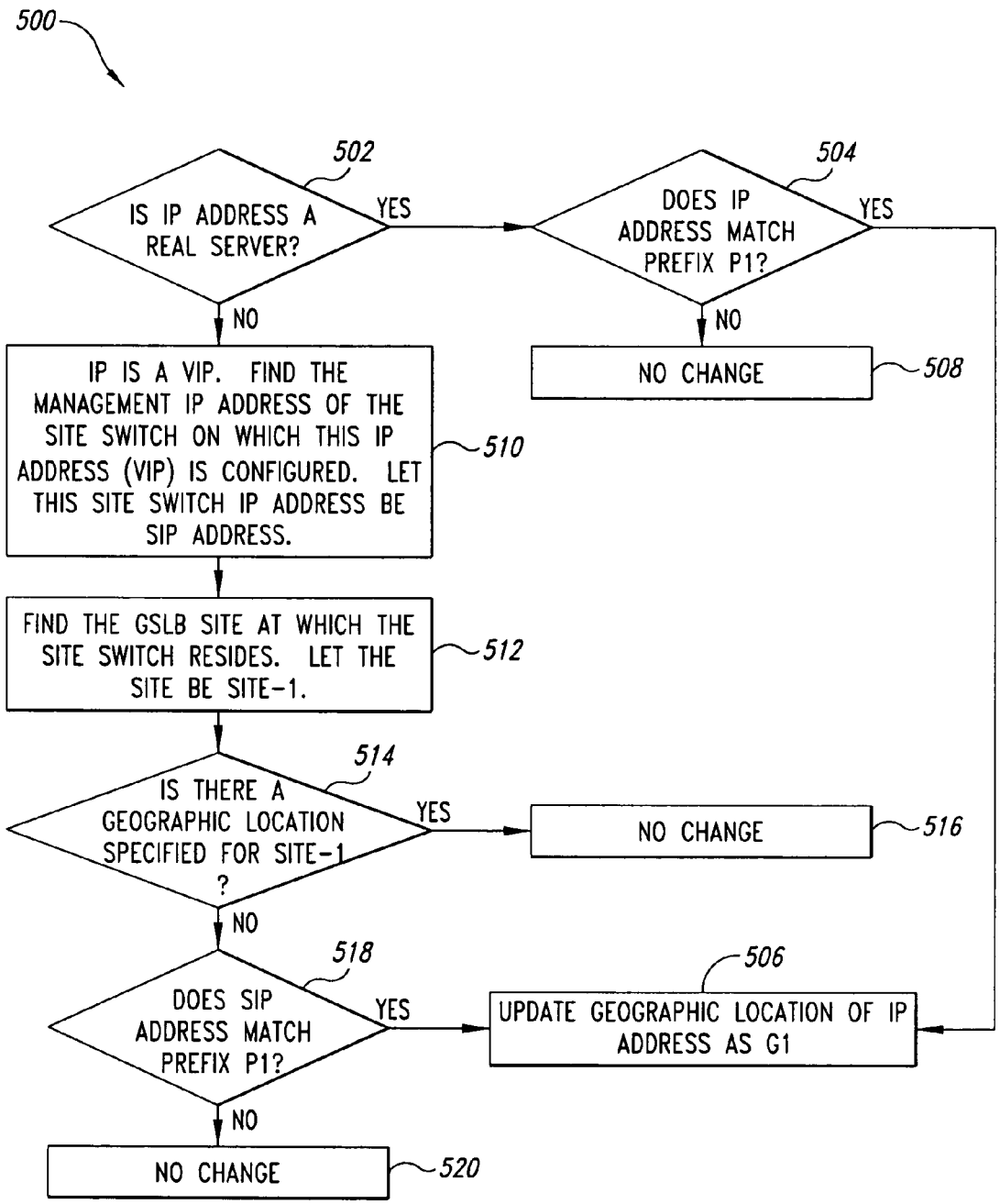
FIG. 5 is a flowchart that depicts updating of geographic regions of domain IP addresses with user-configured geographic prefixes according to an embodiment.

In the flowcharts of FIGS. 4-6, certain operations are depicted. At least some of these operations can be embodied in software or other machine-readable instruction stored on a machine-readable medium. For example, some of the features of the flowcharts can be present as code in the first storage unit 212, in the second storage unit 210, or in some other storage unit of the GSLB switch 12, and executable by the GSLB switch controller 201 or other processor of the GSLB switch 12. Moreover, it is appreciated that the operations need not necessarily occur in the exact order shown. Also, operations may be added, removed, combined, or modified in various embodiments.

FIG. 4 is a flowchart 400 illustrating configuration of geographic prefix data according to an embodiment. At a block 402, the user (such as a system administrator) configures the geographic prefix(es) on the GSLB switch controller 201 of the GSLB switch 12. For example, the user may set the geographic region for the prefix 149.204.0.0/16 as EUROPE.

At a block 404, the GSLB switch 12 maintains the user-configured geographic region for the prefix in a user-configurable geographic prefix database (referred to in the flowcharts as the database "DY-GEO-DB"). The DY-GEO-DB database contains the information that can be dynamically provided or changed by the user, and is maintained in the second storage unit 210 in one embodiment.

At a block 406, if the above prefix already exists in the static internal geographic database (referred to in the flowcharts as the database "ST-GEO-DB") maintained in the first storage unit 212, then the above user configuration takes precedence over that static entry. At a block 408, the GSLB switch 12 updates the geographic region for all the IP addresses (for the domains for which the GSLB switch 12 is providing GSLB) that match the above IP address prefix, so as to reflect the new geographic region configured by the user for this prefix. The operations at the block 408 are shown in further detail in FIG. 5.

FIG. 5 is a flowchart 500 that depicts the updating of the geographic region of domain IP addresses with the user-configured geographic prefix according to an embodiment. When the user configures a geographic prefix at the block 402 of FIG. 4, then the GSLB switch 12 updates the geographic prefix for each IP address in the domain for which the GSLB switch 12 is providing GSLB.

As an example, the user configures a prefix P1 to be in a geographic region G1. Then, for each of the IP addresses in the domains for which the GSLB switch 12 is providing GSLB, the GSLB switch 12 (or more specifically the GSLB switch controller 201 in an embodiment) determines at a block 502 whether the IP address corresponds to a real server. If the IP address corresponds to a real server, then the GSLB switch 12 determines at a block 504 whether the IP address matches the prefix P1. If there is a match, then the GSLB switch 12 updates the geographic location of that IP address as the geographic region G1 at a block 506. If there is no match at the block 504, then no updates are made to the geographic location of this IP address (as depicted at a block 508).

Back at the block 502, if the IP address is determined by the GSLB switch 12 as not corresponding to a real server, then the IP address is deemed to be a VIP address at a block 510. The GSLB switch 12 then finds the management IP address of the site switch on which this VIP is configured. The IP address of the site switch may be found in a table or other address records maintained by or accessible to the GSLB switch 12. The IP address of this site switch is referred to as "SIP" address in FIG. 5.

At a block 514, the GSLB switch 12 finds the GSLB site at which the site switch resides. This GSLB site is referred to as "Site-1" in FIG. 5. The GSLB switch 12 determines at a block 514 whether there is a geographic location specified for Site-1. If there is a geographic location specified, then no change is made to that geographic location (as depicted at a block 516). Else if there is no geographic location specified for Site-1, then the flowchart 500 proceeds to a block 518.

At the block 518, the GSLB switch 12 determines whether the SIP address matches the prefix P1. If there is a match, then the GSLB switch 12 updates the geographic location of that VIP address as the geographic region G1 at the block 506. Else if there is no match at the block 518, then no updates are made to the geographic location of the VIP address (as indicated at a block 520).

Figure 6A:
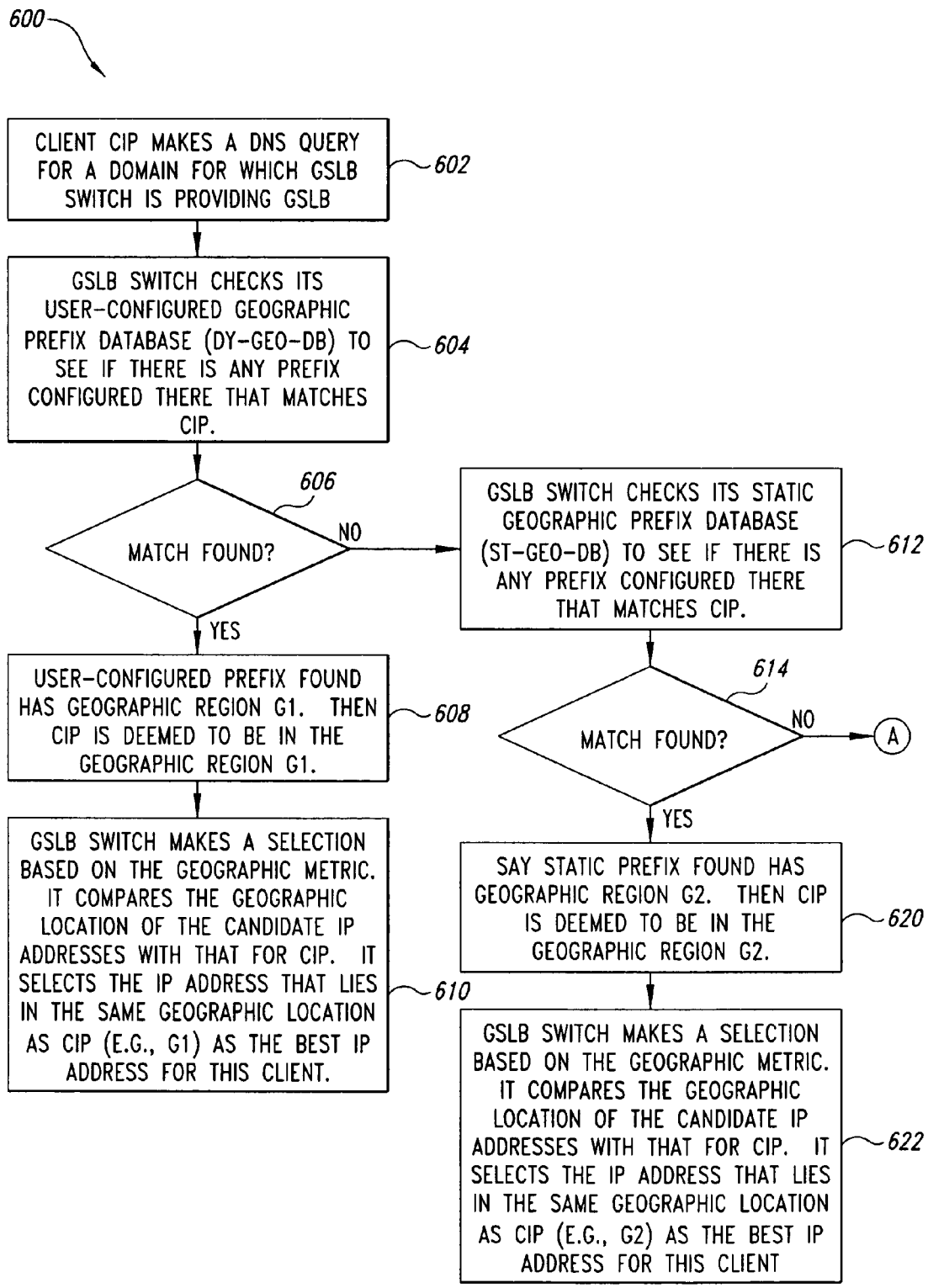
FIGS. 6A-6B show a flowchart that depicts operation of the GSLB system of FIG. 1 to use geographic settings to perform load balancing according to an embodiment.
Figure 6B:
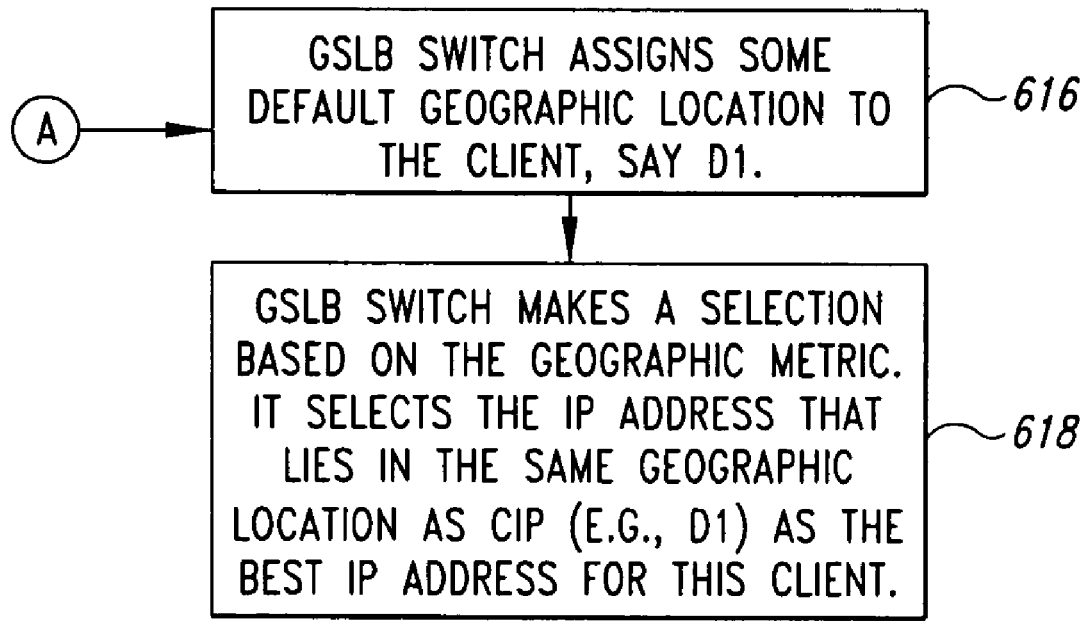

FIGS. 6A-6B show a flowchart 600 that depicts operation of the GSLB system of FIG. 1 to use geographic settings, including user-configured settings, to perform load balancing according to an embodiment. At a block 602, the client program 28, located at a client IP address (CIP), makes a DNS query for a domain for which the GSLB switch 12 is providing GSLB.

At a block 604, the GSLB switch 12 checks its user-configured geographic prefix database (e.g., the DY-GEO-DB database) to determine if there is any prefix configured therein that matches the CIP. If a match is found at a block 606 and the user-configured prefix has a geographic region G1, then the CIP is deemed to be in the geographic region G1 at a block 608.

At a block 610, the GSLB switch 12 makes a selection of the best IP address to provide to the client program 28 based at least in part on the geographic metric. That is, the GSLB switch 12 of one embodiment compares the geographic location of the candidate IP addresses with that for CIP, and selects the candidate IP address that lies in the same geographic location as CIP (i.e., the region G1) as the best IP address for this client.

Back at the block 606, if no match is found between the CIP and the prefixes in the user-configured geographic prefix database, then the GSLB switch 12 checks the static geographic prefix database (e.g., ST-GEO-DB database) at a block 612 to determine if there is any prefix configured therein that matches the CIP. If no match is found at a block 614, then the GSLB switch 12 assigns some default geographic location to the client, for example the region D1, at a block 616. The GSLB switch 12 makes a selection based on the geographic metric at a block 618. The GSLB switch 12 selects the IP address that lies in the same geographic location as the CIP (e.g., the region D1 in this example) as the best IP address for this client Back at the block 614, if a prefix configured in the ST-GEO-DB database matches the CIP and the static prefix that is found has a geographic region G2 (for instance), then the CIP is deemed to be in the geographic region G2 at a block 620. The GSLB switch 12 makes a selection of the best IP address to provide to the client program 28 based at least in part on the geographic metric at a block 622. The GSLB switch 12 compares the geographic location of the candidate IP addresses with that for the CIP, and selects the candidate IP address that lies in the same geographic location as the CIP (e.g., the region G2) as the best IP address for this client.

An example can assist in further illustrating the operations depicted in the previous figures. Consider an example where the GSLB switch 12 is providing GSLB for the domain www.gslb1.com. The IP addresses for the domain www.gslb1.com are as follows:

10.10.10.200—This is a real server IP address; and 151.3.1.76—This is a VIP on a site switch having a management IP address of 151.3.1.102.

Initially, the user-configured geographic database (e.g., the DY-GEO-DB database in the second storage unit 210) is empty, as the user has not yet configured any geographic prefixes. Assume that there is an entry for the prefix 151.3.0.0/16 in the static geographic database (e.g., the ST-GEO-DB database in the first storage unit 212) where the geographic region for the prefix is specified as EUROPE. This means that the geographic location for 151.3.1.76 is EUROPE. Assume also that there is no entry in the static geographic database that matches the IP address 10.10.10.200; hence this IP address is assigned a default geographic location of NORTH AMERICA.

Now, the user wants the prefix 151.3.0.0/16 to be associated with ASIA instead of EUROPE. So, the user configures the geographic prefix 151.3.0.0/16 with a geographic region ASIA. This ASIA setting gets stored in the user-configured geographic prefix database, and will override the original EUROPE setting.

Once the user configures a geographic location for a prefix, the geographic location for the IP addresses in the GSLB domain gets updated as explained with respect to the flowchart 500 of FIG. 5. The new geographic locations of the IP addresses are as follows:

10.10.10.200—NORTH AMERICA (unchanged as this IP address does not match a user-configured prefix); and 151.3.1.76—ASIA.

Now, the user also wants a prefix 175.6.0.0/16 to be associated with ASIA. So, the user configures the geographic prefix 175.6.0.0/16 with a geographic region ASIA. This information also gets stored in the user-configured geographic prefix database. The GSLB switch 12 does not update the geographic location for any IP addresses in the domain www.gslb1.com, since the prefix 175.6.0.0/16 does not match any IP address.

If a client at the IP address 175.6.10.1 makes a query to access the domain www.gslb1.com, the GSLB switch 12 refers to the user-configured geographic prefix database and determines the geographic location of the client to be ASIA. The GSLB switch 12 then selects 151.3.1.76 as the best IP address for the client since they both lie in the same geographic region of ASIA.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, various embodiments have been described above in terms of IP addresses. It is appreciated that other embodiments for providing configurable geographic settings can be implemented for systems that use an addressing scheme that is not necessarily IP-address based.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    storing Internet Assigned Numbers Authority (IANA)-allocated first address prefix information and corresponding IANA-designated first geographic region information;
    storing second address prefix information and corresponding second geographic region information;
    for network addresses that have first address prefix information that matches the second address prefix information, associating these network addresses to the second geographic region information, which is different from said corresponding IANA-designated first geographic region information; and
    selecting one of said network addresses associated to the second geographic region information as an optimum address to provide to a query from a client having a network address that corresponds to the second geographic region information, the method further comprising for each of the network addresses:
    determining whether the network address is a real or virtual address;
    if the network address is determined to be a real address, determining whether the real address matches the second address prefix information;
        if the real address matches the second address prefix information, updating geographic location information associated with the real address with the second geographic region information; and
    if the network address is determined to be a virtual address:
        finding a site address associated with the virtual address;
        determining whether the site address matches the second address prefix information; and
        if the site address matches the second address prefix information, updating geographic location information associated with the virtual address to the second geographic region information.

2. The method of claim 1, further comprising determining a geographic region of a server through which the client can access a domain associated with the optimum address.

3. The method of claim 1, further comprising directing a request from the client to a server of a domain that is geographically close to the client using at least one of: the client and server are in a same continent; the client and server are in a same country; the client and server are in a same state; the client and server are in a same city; and the client and server are in a same user-defined area.

4. The method of claim 1 wherein said selecting includes using specified second geographic region information for a site of a domain associated with said network addresses to load balance the traffic to the site.

5. A method comprising:
    storing Internet Assigned Numbers Authority (IANA)-allocated first address prefix information and corresponding IANA-designated first geographic region information;
    storing second address prefix information and corresponding second geographic region information;
    for network addresses that have first address prefix information that matches the second address prefix information associating these network addresses to the second geographic region information, which is different from said corresponding IANA-designated first geographic region information; and
    selecting one of said network addresses associated to the second geographic region information as an optimum address to provide to a query from a client having a network address that corresponds to the second geographic region information, wherein said selecting includes:
    determining said network address of the client;
    determining whether the network address of the client corresponds to the second geographic region information;
    if the second geographic region information is determined to correspond to the network address of the client, selecting a server associated with the second geographic region information to receive traffic from the client;
    if the second geographic region information is determined to not correspond to the network address of the client, determining whether the network address of the client corresponds to the first geographic region information; and
    if the network address of the client is determined to correspond to the first geographic region information, selecting a server associated with the first geographic region information to receive the traffic from the client.

6. The method of claim 5 wherein said storing IANA-designated first geographic region information includes storing IANA-designated continent designations, and wherein said second geographic region information includes continent designations that are different than said IANA-designated continent designations for matching address prefix information.

7. The method of claim 5 wherein at least one of storing the first and second address prefix information and geographic region information includes storing such information in a database.

8. The method of claim 5, further comprising maintaining the first geographic region information for network addresses that have first address prefix information that does not match the second address prefix information.

9. A method comprising:
    storing static Internet Assigned Numbers Authority (IANA)-designated geographic region information associated with network addresses;
    storing user-specified geographic region information associated with an address portion;
    replacing the stored static geographic region information with the user-specified geographic region information for network address having the address portion said user-specified geographic region information being different from said IANA-designated geographic region information for said network address; and determining which of the network addresses to direct traffic from a client based at least in part on whether an address of the client more closely corresponds to the user-specified geographic region information, the method further comprising for each of the network addresses:

determining whether the network address is a real or virtual address;

if the network address is determined to be a real address, determining whether the real address matches the address portion;
   if the real address matches the address portion, updating geographic location information associated with the real address with the user-specified geographic region information; and if the network address is determined to be a virtual address:
   finding a site address associated with the virtual address;
   determining whether the site address matches the address portion; and
   if the site address matches the address portion, updating geographic location information associated with the virtual address to the user-specified geographic region information.

10. The method of claim 9 wherein said determining which of the network address to direct traffic from the client, based at least in part on whether the address of the client more closely corresponds to the user-specified geographic region information, includes directing a request from the client to a server that is geographically close to the client based on at least one of: the client and server are in a same continent; the client and server are in a same country; the client and server are in a same state; the client and server are in a same city; and the client and server are in a same user-defined area.

11. A method, comprising:
storing static Internet Assigned Numbers Authority (IANA)-designated geographic region information associated with network addresses;
storing user-specified geographic region information associated with an address portion;
replacing the stored static geographic region information with the user-specified geographic region information for network address having the address portion, said user-specified geographic region information being different from said IANA-designated geographic region information for said network address; and
determining which of the network addresses to direct traffic from a client, based at least in part on whether an address of the client more closely corresponds to the user-specified geographic region information, wherein said determining includes:
determining the address of the client;
determining whether the client address corresponds to the user-specified geographic region information;
if the client address is determined to correspond to the user-specified geographic region information, selecting a server associated with the user-specified geographic region information to receive the traffic from the client;
if the client address is determined to not correspond to the user-specified geographic region information, determining whether the client address corresponds to the static geographic region information; and
if the client address is determined to correspond to the static geographic region information, selecting a server associated with the static geographic region information to receive the traffic from the client.

12. The method of claim 11 wherein said storing user-specified geographic region information associated with the address portion includes storing user-specified geographic region information associated with an address prefix.

13. An article of manufacture, comprising:
a storage medium having instructions stored thereon that are executable by a processor to:
read Internet Assigned Numbers Authority (IANA)-allocated first address prefix information and corresponding IANA-designated first geographic region information;
read second address prefix information and corresponding second geographic region information;
for network addresses that have first address prefix information that matches the second address prefix information, associate these network addresses to the second geographic region information, which is different from said corresponding IANA-designated first geographic region information; and
select one of said network addresses associated to the second geographic region information as an optimum address to provide to a query from a client having a network address that corresponds to the second geographic region information, wherein the storage medium further includes instructions stored thereon that are executable by said processor to, for each of the network addresses:
determine whether the network address is a real or virtual address;
if the network address is determined to be a real address, determine whether the real address matches the second address prefix information;
   if the real address matches the second address prefix information, update geographic location information associated with the real address with the second geographic region information; and
if the network address is determined to be a virtual address:
   find a site address associated with the virtual address;
   determine whether the site address matches the second address prefix information; and
   if the site address matches the second address prefix information, update geographic location information associated with the virtual address to the second geographic region information.

14. The article of manufacture of claim 13 wherein the instructions to select include instructions to use specified second geographic region information for a site of a domain associated with said network addresses to load balance the traffic to the site.

15. An article of manufacture, comprising:
a storage medium having instructions stored thereon that are executable by a processor to:
read Internet Assigned Numbers Authority (IANA)-allocated first address prefix information and corresponding IANA-designated first geographic region information;
read second address prefix information and corresponding second geographic region information;
for network addresses that have first address prefix information that matches the second address prefix information, associate these network addresses to the second geographic region information, which is different from said corresponding IANA-designated first geographic region information; and
select one of said network addresses associated to the second geographic region information as an optimum address to provide to a query from a client having a network address that corresponds to the second geographic region information, wherein the instructions to select include instructions executable by said processor to:

determine said network address of the client;

determine whether the network address of the client corresponds to the second geographic region information;

if the second geographic region information is determined to correspond to the network address of the client, select a server associated with the second geographic region information to receive traffic from the client;

if the second geographic region information is determined to not correspond to the network address of the client, determine whether the network address of the client corresponds to the first geographic region information; and if the network address of the client is determined to correspond to the first geographic region information, select a server associated with the first geographic region information to receive the traffic from the client.

16. A system, comprising:

a means for storing static Internet Assigned Numbers Authority (IANA)-designated geographic region information associated with network addresses;

a means for storing user-specified geographic region information associated with an address portion; and a controller means for replacing the stored static geographic region information with the user-specified geographic region information for network address having the address portion said user-specified geographic region information being different from said IANA-designated geographic region information for said network address and for determining which of the network addresses to direct traffic from a client based at least in part on whether an address of the client more closely corresponds to the user-specified geographic region information, wherein said controller means is further:

for determining, for each of the network addresses, whether the network address is a real or virtual address;

if the network address is determined to be a real address, for determining whether the real address matches the address portion;
  if the real address matches the address portion, for updating geographic location information associated with the real address with the user-specified geographic region information;

if the network address is determined to be a virtual address:

for finding a site address associated with the virtual address;

for determining whether the site address matches the address portion; and if the site address matches the address portion, for updating geographic location information associated with the virtual address to the user-specified geographic region information.

17. The system of claim 16 wherein said controller means determines whether to use a geographic region associated with a management address of a network device for a site or a user-specified geographic region associated with the site to perform load balancing.

18. A system comprising:

a means for storing static Internet Assigned Numbers Authority (IANA)-designated geographic region information associated with network addresses;

a means for storing user-specified geographic region information associated with an address portion; and a controller means for replacing the stored static geographic region information with the user-specified geographic region information for network address having the address portion, said user-specified geographic region information being different from said IANA-designated geographic region information for said network address, and for determining which of the network addresses to direct traffic from a client, based at least in part on whether an address of the client more closely corresponds to the user-specified geographic region information, wherein said controller means is further:

for determining the address of the client;

for determining whether the client address corresponds to the user-specified geographic region information;

if the client address is determined to correspond to the user-specified geographic region information, for selecting a server associated with the user-specified geographic region information to receive the traffic from the client;

if the client address is determined to not correspond to the user-specified geographic region information, for determining whether the client address corresponds to the static geographic region information; and if the client address is correspond to the static geographic region information, for selecting a server associated with the static geographic region information to receive the traffic from the client.

19. The system of claim 18 wherein said controller means load balances traffic to the network addresses based on a plurality of performance metrics.

20. An apparatus comprising:

a first storage unit to store Internet Assigned Numbers Authority (IANA)-allocated first address prefix information and corresponding IANA-designated first geographic region information;

a second storage unit to store second address prefix information and corresponding second geographic region information;

a controller coupled to the first and second storage units to, for network addresses that have first address prefix information that matches the second address prefix information associate these network addresses to the second geographic region information, which is different from said corresponding IANA-designated first geographic region information; and software code executable by the controller to select one of said network addresses associated to the second geographic region information as an optimum address to provide to a query from a client having a network address that corresponds to the second geographic region information, wherein the software code includes:

code to determine, for each of the network addresses, whether the network address is a real or virtual address;

if the network address is determined to be a real address, code to determine whether the real address matches the second address prefix information;

if the real address matches the second address prefix information, code to update geographic location information associated with the real address with the second geographic region information; and if the network address is determined to be a virtual address:

code to find a site address associated with the virtual address;

code to determine whether the site address matches the second address prefix information; and if the site address matches the second address prefix information, code to update geographic location information associated with the virtual address to the second geographic region information.

21. An apparatus comprising:

a first storage unit to store Internet Assigned Numbers Authority (IANA)-allocated first address prefix information and corresponding IANA-designated first geographic region information;

a second storage unit to store second address prefix information and corresponding second geographic region information;

a controller coupled to the first and second storage units to, for network addresses that have first address prefix information that matches the second address prefix information associate these network addresses to the second geographic region information, which is different from said corresponding IANA-designated first geographic region information; and software code executable by the controller to select one of said network addresses associated to the second geographic region information as an optimum address to provide to a query from a client having a network address that corresponds to the second geographic region information, wherein the software code includes:

code to determine said network address of the client;

code to determine whether the network address of the client corresponds to the second geographic region information;

if the second geographic region information is determined to correspond to the network address of the client, code to select a server associated with the second geographic region information to receive traffic from the client;

if the second geographic region information is determined to not correspond to the network address of the client, code to determine whether the network address of the client corresponds to the first geographic region information; and if the network address of the client is determined to correspond to the first geographic region information, code to select a server associated with the first geographic region information to receive the traffic from the client.

22. The apparatus of claim 21 wherein at least one of the first and second storage units is a database.

23. The apparatus of claim 21 wherein at least a portion of the first and second storage units are integrated in a single storage unit.

* * * * *

UNITED STATES PATENT AND TRADEMARK OFFICE
CERTIFICATE OF CORRECTION

| | | |
|---|---|---|
| PATENT NO. | : 7,496,651 B1 | Page 1 of 1 |
| APPLICATION NO. | : 10/840496 | |
| DATED | : February 24, 2009 | |
| INVENTOR(S) | : Prajakta S. Joshi | |

It is certified that error appears in the above-identified patent and that said Letters Patent is hereby corrected as shown below:

Title Page 2, column 2, 7th line after "OTHER PUBLICATIONS", "10/206,508" should read --10/206,580--.

Column 12, line 8, "A method comprising:" should read --A method, comprising:--.

Column 12, line 58, "A method comprising:" should read --A method, comprising:--.

Column 13, line 4, "a client based" should read --a client, based--.

Column 15, line 29, "address portion said" should read --address portion, said--.

Column 15, line 32, "address and for" should read --address, and for--.

Column 15, line 33, "a client based" should read --a client, based--.

Signed and Sealed this

Sixteenth Day of March, 2010

David J. Kappos
*Director of the United States Patent and Trademark Office*